United States Patent [19]

Aoki

[11] Patent Number: 5,195,076
[45] Date of Patent: Mar. 16, 1993

[54] DEFECT DETECTION CIRCUIT FOR OPTICAL PICK UP DEVICE

[75] Inventor: Ikuo Aoki, Yokohama, Japan

[73] Assignee: Ricoh Company, Ltd., Tokyo, Japan

[21] Appl. No.: 721,707

[22] Filed: Jun. 26, 1991

[30] Foreign Application Priority Data

Jul. 4, 1990 [JP] Japan .................................. 2-176977

[51] Int. Cl.$^5$ ........................ G11B 7/00; G11B 7/095
[52] U.S. Cl. .................................. 369/58; 369/44.25; 369/44.32
[58] Field of Search ................... 369/124, 44.25, 44.26, 369/44.32, 44.33, 44.34, 44.13, 54, 58, 44.27, 44.35, 48, 59; 250/207.5

[56] References Cited

U.S. PATENT DOCUMENTS

| | | | |
|---|---|---|---|
| 4,748,609 | 5/1988 | Yonezawa et al. | 369/44.34 |
| 4,785,442 | 11/1988 | Ohtake et al. | 369/44.32 |
| 4,847,822 | 7/1989 | Takasugi et al. | 369/44.13 |
| 4,872,152 | 10/1989 | Tsuyoshi et al. | 369/124 |
| 4,972,398 | 11/1990 | Wachi | 369/44.25 |

FOREIGN PATENT DOCUMENTS 0155426 6/1988 Japan .

*Primary Examiner*—Aristotelis Psitos
*Assistant Examiner*—Thang V. Tran
*Attorney, Agent, or Firm*—Cooper & Dunham

[57] ABSTRACT

A defect detection circuit for optical pick up device having a record medium on which a track is formed which track has a plurality of segments formed in series along the track. The circuit comprises a first detection circuit for detecting a defect of a segment sampled to be detected by comparing difference between a latest data of a refresh signal from the segment and a preceding data of a refresh signal from a preceding segment sampled before the segment to be detected with a first predetermined value. The circuit further comprises a second detection circuit for detecting a defect of the segment to be detected by comparing the latest data with a second predetermined value and a discrimination circuit for discriminating whether the segment is defective or not.

6 Claims, 5 Drawing Sheets

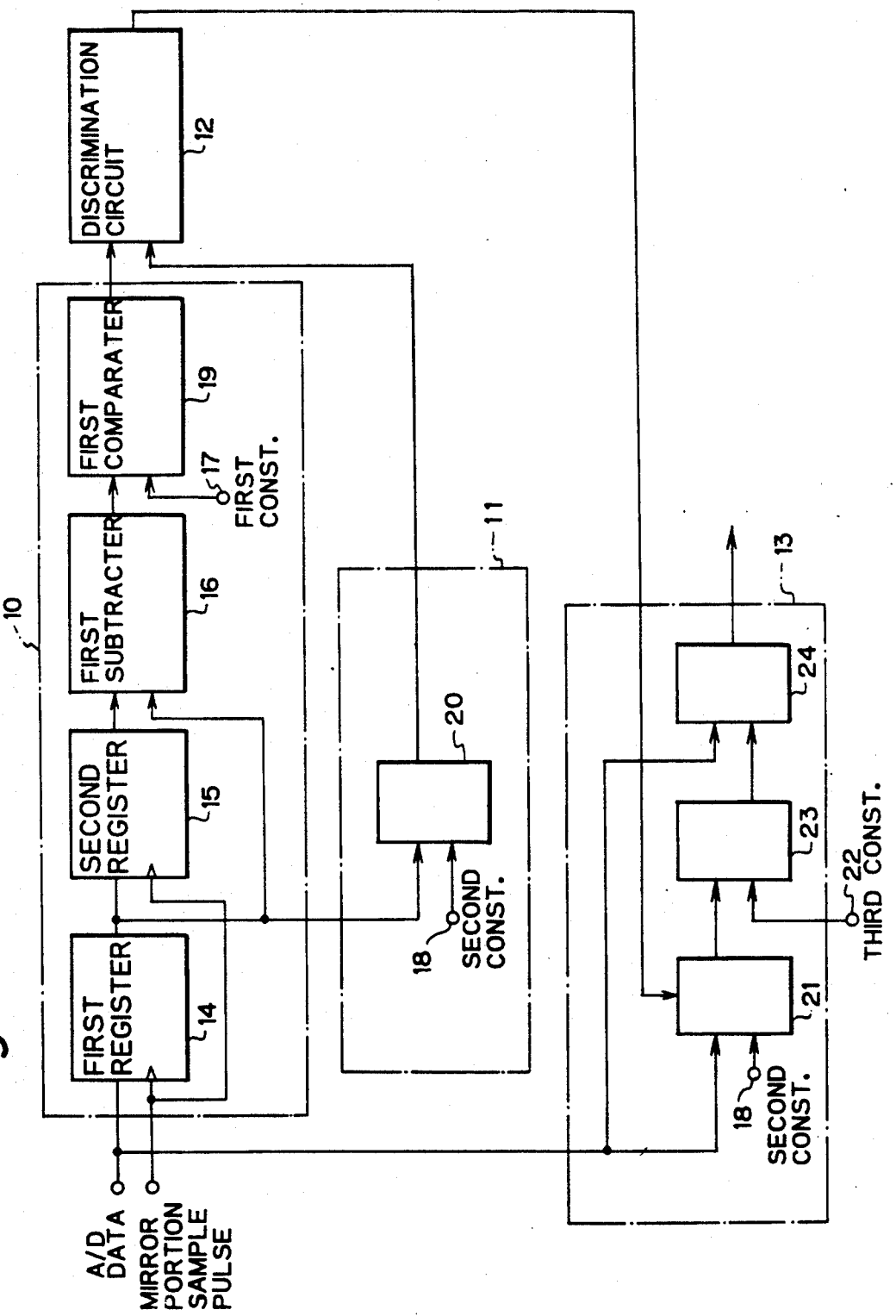

DEFECT DETECTION CIRCUIT FOR OPTICAL PICK UP DEVICE

BACKGROUND OF THE INVENTION

1. Field of the Invention

The present invention relates to a defect detection circuit for an optical pick up device.

2. Description of the Related Art

An optical pick up device is disclosed in Japanese Patent Application Laying Open (KOKAI) No.63-155426 wherein a sample servo control system is used for controlling the focusing and tracking operation of the device. According to the disclosed system, the focusing control and the tracking control of the optical spot irradiated on the optical information recording medium is conducted in such a way that an error amount of a new sample is compared with an amount of preceding sample and if the difference between the two amounts is less than a predetermined value, the new sample amount is adopted as a valid amount for the new sample, whereas if the difference is more than the predetermined value, an amount for the new sample is determined by adding the predetermined value to the preceding sample amount.

Such a control method is called window method. According to the window method, the defects in the prepit portion can be detected and it becomes possible to avoid malfunction of the servo system due to the sampling error caused by defective pits formed on the recording medium, which reduces the noise due to the sampling error.

In general, there are two methods for detecting a defective pit. A first method is a pattern matching method in which a defective pit is detected on the basis that the refresh signal from the prepit portion has a constant pattern so that the pit having a pattern other than the constant pattern is identified as being defective.

A second method is a window method, which is used in the above-mentioned patent document, wherein if the difference between the amounts of the adjacent pits exceeds a predetermined value, the pit is identified as being defective.

With regard to the first pattern matching method, it is inconvenient to set a threshold value for digitizing the refresh signal at the time of identifying the pattern of the signal.

Also, with regard to the second window method, the defective pit is detected on the basis of the relative value between the adjacent pits. It is hard to accurately and reliably identify the defective pit only from such a relative value.

SUMMARY OF THE INVENTION

It is therefore an object of the present invention to provide a defective detection circuit for an optical pick up device which obviates the above-mentioned problems and detects the defective pits accurately and reliably.

The above-mentioned object of the present invention can be achieved by a defect detection circuit for optical pick up device having a record medium on which a track is formed which track has a plurality of segments formed in series along the track, the circuit comprising:

a first detection circuit for detecting a defect of a segment sampled to be detected by comparing difference between a latest data of a refresh signal from the segment and a preceding data of a refresh signal from a preceding segment sampled before the segment to be detected with a first predetermined value;

a second detection circuit for detecting a defect of the segment to be detected by comparing the latest data with a second predetermined value; and a discrimination circuit for discriminating whether the segment is defective or not.

An advantage of the present invention as described in detail later is that it becomes possible to accurately and reliably detect the defective portion in the prepit area and mirror area by the arrangement wherein not only the relative value is utilized to detect the defective portion but also the absolute value is utilized as well.

Further objects and advantages of the present invention will be apparent from the following description of the preferred embodiments of the invention as illustrated in the accompanying drawings.

BRIEF DESCRIPTION OF THE DRAWINGS

FIG. 3 is a circuit diagram of a defect detection circuit in accordance with an embodiment of the present invention;

DESCRIPTION OF THE PREFERRED EMBODIMENTS

Figure 1A:
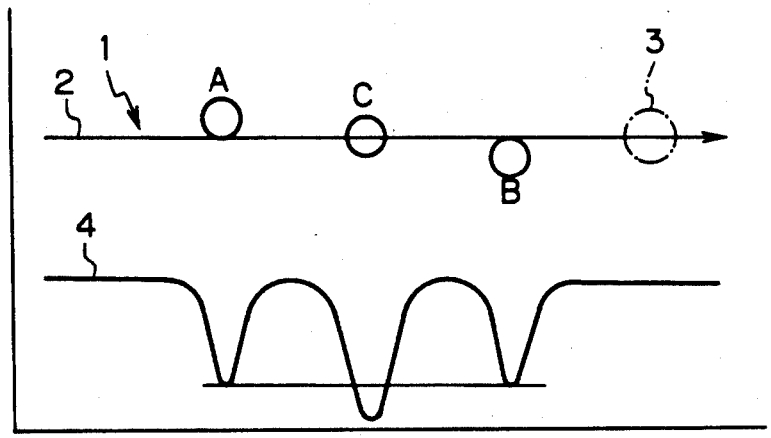
FIGS. 1a to 1c are explanatory views for explaining the principle of detection of a track error signal.

Embodiments of the present invention are described hereinafter with reference to the drawings and in comparison to the related art which is also described referring to the drawings.

Figure 1B:
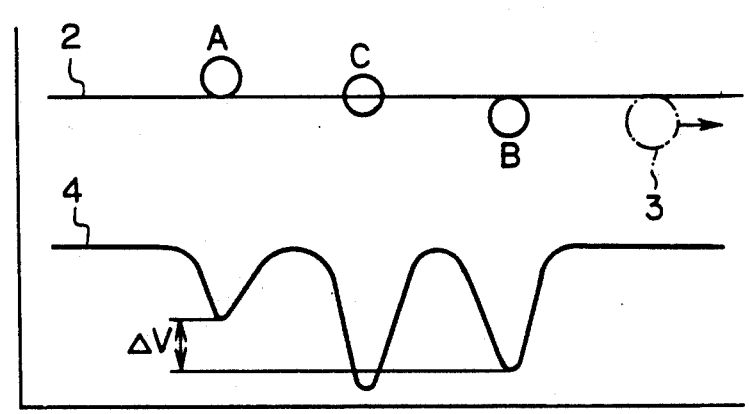
Figure 1C:
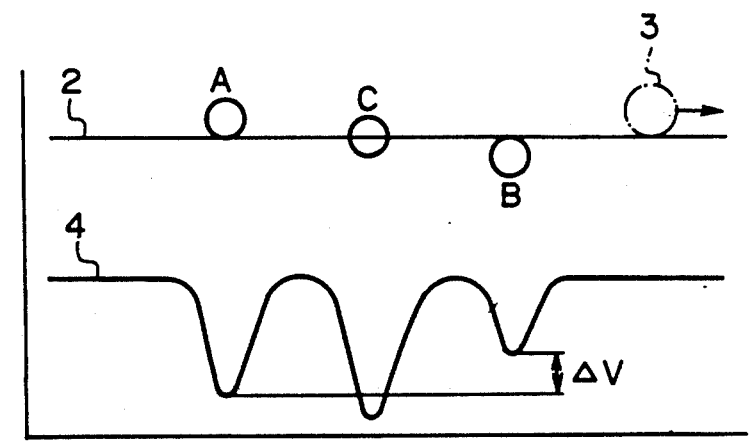

FIGS. 1a to 1c represent an example of the sample servo method for detecting defective pits. FIG. 1a illustrates wobbling pits A and B and a clock pit C formed along a track 2 formed on a surface of an optical disk 1. The pits A and B constitute a prepit portion for controlling tracking. The pit A is dislocated from the track center 2 to one side of the center. The pit B is dislocated from the track center to the other side. The pit C is formed on the track center 2 in order to generate a clock signal to be used in the PLL control operation. An optical spot 3 scans the disk 1 along the center of the track 2 to generate a refresh (RF) signal 4.

The tracking servo control is conducted on the basis of the level change of the refresh signal. More precisely, the tracking servo control is conducted on the basis of the difference between the peak levels of the signal at the pits A and B. That is, when the optical spot 3 is dislocated from the track center 2, as illustrated in FIGS. 1b or 1c, the peak level of the signal at each of the pits A and B changes. The difference $\Delta V$ between the peak levels of pits A and B is detected. The displacement of the spot 3 from the track center 2 is obtained from the difference ΔV, the result of which is used to control the tracking motion of the spot.

In that case, if the prepit (pit A, B or C) is defective, the tracking control and PLL control are not reliably conducted with the use of the sampling signal from the prepit as it is. Therefore it becomes necessary to detect the defective pit so as not to use the error sampling signal.

An example of the method for detecting the defective pits is described below with reference to FIGS. 2a and 2b.

Figure 2A:
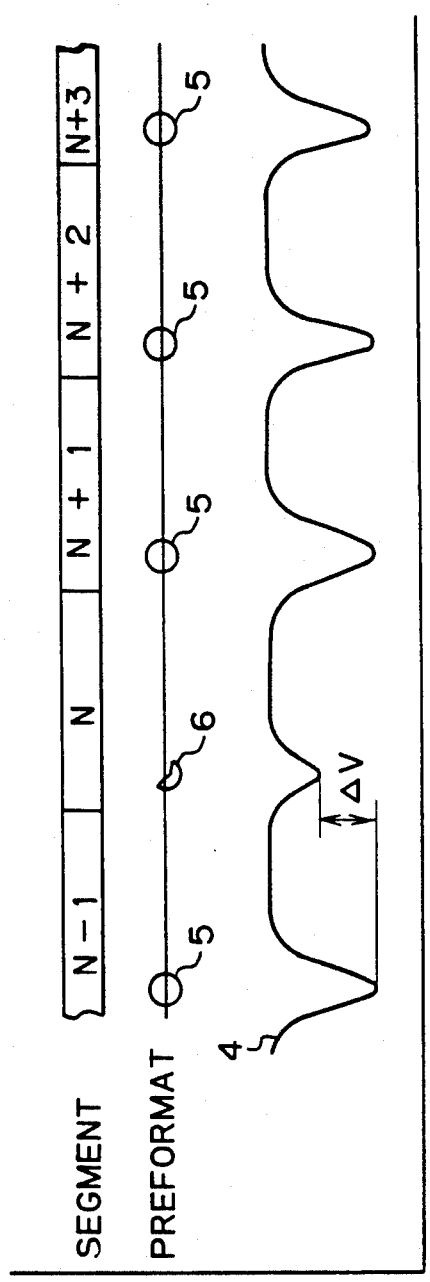
FIG. 2a is an explanatory view for explaining an example of a defective pit.

FIG. 2a illustrates a series of pits including one defective pit 6 disposed in a row of normal pits 5. In this case, the level difference ΔV of the two peak values of the refresh signal 4 is larger than a predetermined value so that the defective pit 6 can be detected.

Figure 2B:
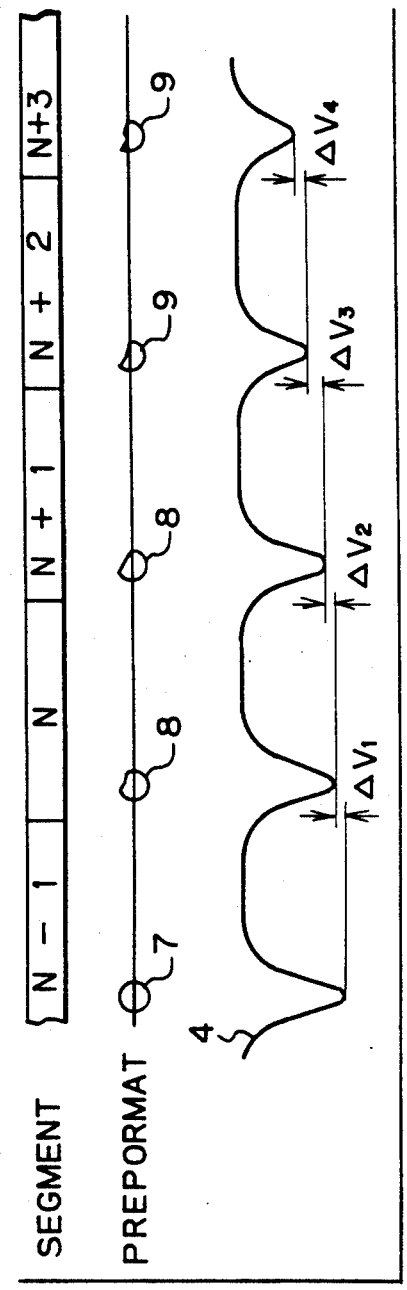
FIG. 2b is an explanatory view for explaining another example of defective pits.

On the other hand, if the pits in the row are formed as illustrated in FIG. 2b wherein a normal pit 7 is disposed followed by slightly defective pits 8 and defective pits 9, the level differences $\Delta V_1$ to $\Delta V_4$ of the respective adjacent pits are less than the predetermined value. Accordingly, the defective pits can not be detected.

Such a problem can be obviated by the embodiments of the present invention described below with reference to FIGS. 3 to 6.

FIG. 3 illustrates a detection device in accordance with the present invention. The device essentially comprises a relative value defect detection circuit 10, an absolute value defect detection circuit 11, a discrimination circuit 12, and a threshold generating defect comparator circuit 13. The circuit 10 comprises a first register 14 which memorizes the sampling signal from the mirror portion now being sampled, a second register 15 which memorizes the sampling signal from the preceding mirror portion sampled right before the mirror portion now being sampled, a first subtracter 16 which conducts the subtraction between the outputs from the registers 14 and 15, and a first comparator 19 which compares the output from the subtracter 16 and a first constant level 17.

Also, the circuit 11 comprises a second comparator 20 which compares the sampling signal from the mirror portion now being sampled with a second constant level 18.

Further, the output sides of the circuits 10 and 11 are connected to the circuit 12 which determines whether the defects exist or not on the basis of the outputs from the circuits 10 and 11.

Further, the circuit 12 is connected to the comparator circuit 13. The circuit 13 comprises a selector 21 which selects the sampling signal from the mirror portion now being sampled or the second constant level 18 on the basis of the output from the circuit 12, a second subtracter 23 which conducts the subtraction between the output from the selector 21 and a third constant value 22, and a third comparator 24 which compares the output from the subtracter 23 and the sampling signal.

The circuit 10 is described further in detail below.

First, a sampling signal (refresh signal) is converted from the analog value to the digital value. The converted data of the signal (referred to as A/D data below) is input to the first register 14. A mirror portion is arranged for every segment (see FIGS. 3). The A/D data of each mirror portion is latched in the register 14.

After that, the output from the register 14 is input to the second register 15. Also, the output data of the register 14 is latched in the register 15 at the same timing as the latch timing of the register 14. As a result, the output data of the register 15 is the data of the preceding mirror portion which is one segment before the portion now being sampled.

The outputs from the registers 14 and 15 are input to the subtracter 16 so as to obtain the difference between the data of the latest segment and the preceding segment. The difference data is input to the comparator 19 which compares the data with the first constant value 17. The value 17 is an allowable value of difference between the mirror portion data of the latest segment output from the subtracter 16 and the data of the preceding segment. If the difference is within the value 17, the mirror portion has no defects, whereas if the difference is more than the value 17, the mirror portion of the latest segment has a defective pit.

Next, the circuit 11 is further described in detail below.

The A/D data of the mirror portion of the latest segment output from the register 14 is input to the comparator 20 where the data is compared with the second constant level 18. The value of the level 18 is determined as a value around the minimum A/D data when the mirror portion has no defects considering the allowable change of the level of the refresh signal due to the reflectivity change of the recording medium. As a result, it becomes possible to determine whether the absolute value of the A/D data of the mirror portion is defective or not.

After that, the discrimination results of the relative value output from the circuit 10 and the absolute value output from the circuit 11 are input to the circuit 12. The circuit 12 determines whether the A/D data of the mirror portion is to be adopted or not.

The table 1 below represents the result of the discrimination output from the circuit 12.

TABLE 1

| Relative Value Output | Absolute Value Output | Discrimination Result |
| --- | --- | --- |
| O | O | Latest A/D Data |
| O | X | Second Value |
| X | O | Second Value |
| X | X | Second Value |

Note: O; not defective, X; defective

As can be seen from the table, only when both of the relative value output and the absolute value output represent that the mirror portion has no defect (represented by mark O), the circuit 12 outputs the A/D data of the mirror portion. Whereas if the relative value output or absolute value output represents that the mirror portion has a defect (represented by mark Z), the circuit 12 outputs the second constant value 18 instead of the A/D data of the mirror portion.

Next, the circuit 13 is further described in detail below.

Figure 4:
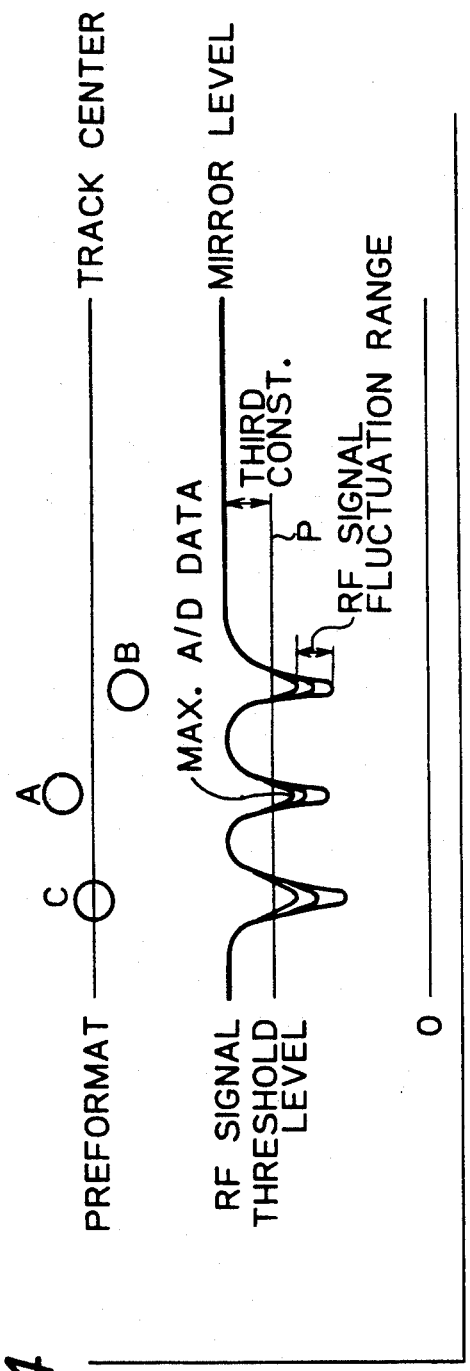
FIG. 4 is an explanatory view for explaining a method for setting the threshold value in accordance with the present invention.

The A/D data or second constant level 18 output from the circuit 12 is selected by the selector 21. The output from the selector 21 and a third constant level 22 are input to a second subtracter 23 which conducts subtraction between the two input data. The third constant level is set as being smaller than the difference between the maximum A/D data of the prepit portion and the A/D data of the mirror portion in the nondefective state, as illustrated in FIG. 4. The output from the subtracter 23 is uses as a threshold value P for detecting the defect of the mirror portion. As illustrated in FIG. 4, the A/D data of refresh signal is compared with the threshold level P by the third comparator 24 so as to detect whether the mirror portion is defective or not.

An example of such a defect detection process is described below with reference to FIGS. 5a and 5b.

Figure 5A:
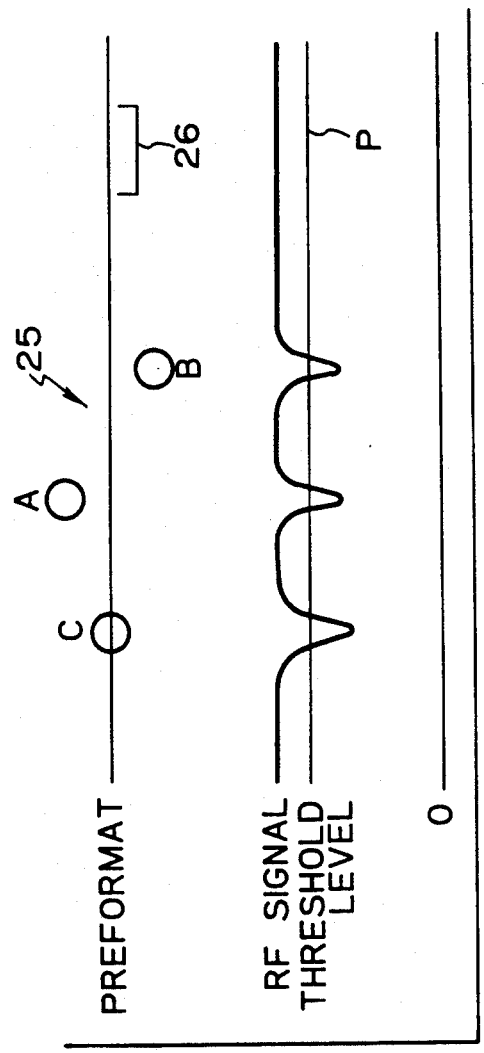
FIGS. 5a and 5b are explanatory views for explaining the method for detecting the defective portion in the pit area and mirror area.

FIG. 5a illustrates a normal state of the record medium wherein there are no defects in the prepit portion 25 comprising wobbling pits A and B and a clock pit C and the mirror portion 26. In such a state, the A/D data (RF signal) of the portion 25 is smaller than the threshold level P while the A/D data of the mirror portion 26 other than the pit portion 25 becomes larger than the level P.

Figure 5B:
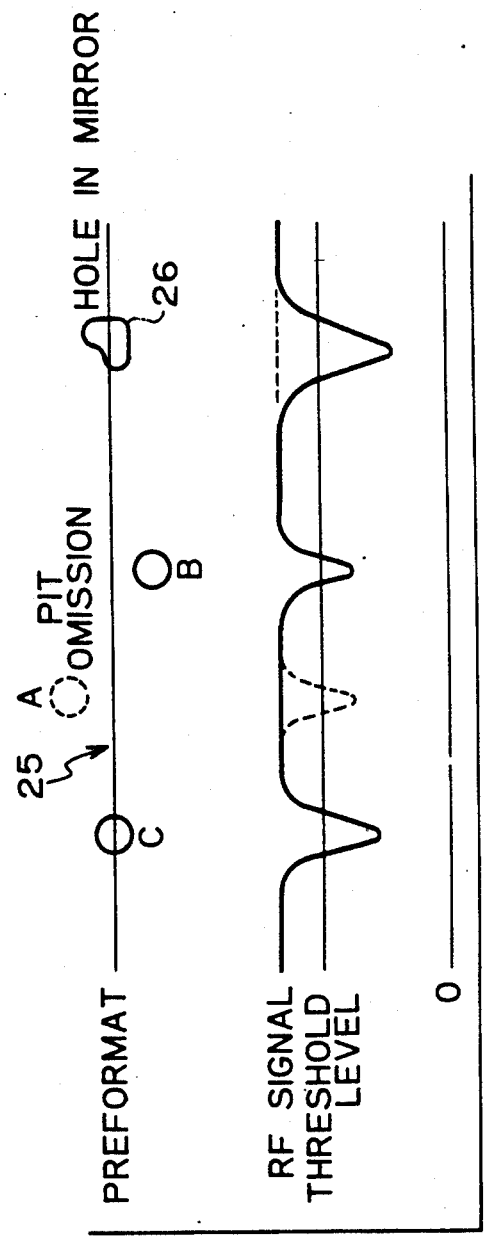

On the other hand, FIG. 5b illustrates a defective state of the record medium wherein the pit A is missing and the mirror portion 26 has a hole. In such a defective state, the A/D data of the portion 25 becomes larger than the level P while the A/D data of the mirror portion 26 becomes smaller than the level P. As a result, it becomes possible to detect the defective state.

With regard to the format arrangement wherein the mirror portion 26 is disposed behind the prepit portion 25, as illustrated in FIGS. 5a and 5b, it is possible to detect the defective state of the portion 26 on the basis of the threshold level P. In this case, the level P is determined on the basis of the signal level of the preceding mirror portion disposed one segment before the portion 26 now being sampled. Also, the latest data of the threshold level P determined from the mirror portion 26 now being sampled is used for detecting the defects of the next segment.

Figure 6:
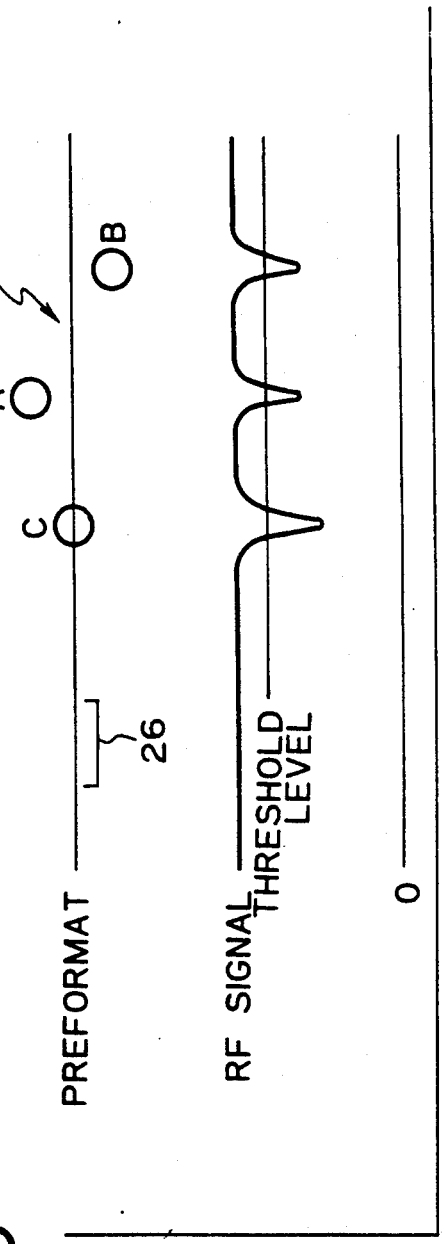
FIG. 6 is an explanatory view for explaining a variant of the preformat portion according to the present invention.

FIG. 6 illustrates another format arrangement wherein the mirror portion 26 is disposed before the prepit portion 25. In accordance with such an arrangement, it becomes possible to use the latest data of the level P obtained from the portion 26 in the segment now being sampled as it is for detecting the defective state of the pit portion 25 or mirror portion 26 of the segment now being sampled. In this case, the defects can be detected in the same way as the case of FIG. 5b.

As mentioned above, in accordance with the embodiment of the present invention, the defect of the prepit portion 25 or mirror portion 26 is detected in such a way that not only the output from the detection circuit 10 on the basis of relative value but also the output from the detection circuit 11 on the basis of the absolute value are used for detecting the defective state. Therefore, it becomes possible to accurately and reliably detect the defects in the prepit portion 25 and mirror portion.

In accordance with the present invention, the invention is applied to an optical pick up device comprising an optical information record medium which has a preformat portion having a prepit portion and a mirror portion formed therein, the focus servo control and the track servo control of the device being conducted on the basis of a sampling signal detected from a sampled prepit portion and a sampled mirror portion. The improvement resides in that the device comprises a first register for memorizing the sampling signal of the mirror portion now being sampled, a second register for memorizing the sampling signal of the preceding mirror portion sampled right before the portion now being sampled, a first subtracter for conducting the subtraction between the outputs from the first and second registers, and a relative value defect detection circuit composed of a first comparator which compares the output from the first subtracter and a first constant level. The device further comprises an absolute value defect detection circuit composed of a second comparator which compares the sampling signal of the mirror portion now being sampled with a second constant level. The device comprises a discrimination circuit for determining whether the mirror portion now being sampled is defective or not on the basis of the outputs from the relative value defect detection circuit and the absolute value defect detection circuit. The device comprises a selector for selecting the sampling signal of the mirror portion now being sampled or the second constant level in response to the output from the discrimination circuit. The device further comprises a second subtracter for conducting the subtraction between the output from the selector and a third constant level. The device further comprises a threshold generating defect comparing circuit composed of a third comparator which compares the output from the second subtracter with the sampling signal. An arrangement is made for detecting the defects of the prepit portion and the mirror portion with the use not only of the relative value output but also of the absolute value output, which makes it possible to accurately and reliably detect the defective state in the prepit portion and the mirror portion.

Many widely different embodiment of the present invention may be constructed without departing from the spirit and scope of the present invention. It should be understood that the present invention is not limited to the specific embodiments described in the specification, except as defined in the appended claims.

What is claimed is:

1. A defect detection circuit for an optical pick up device having a record medium on which a track is formed and which has a plurality of segments formed in series along the track, said defect detection circuit comprising:

a pick up element generating a refresh signal by sampling segments of said track, said refresh signal including current segment data derived by sampling a current segment and preceding segment data derived by sampling a segment preceding the current segment;

a source of a first predetermined value and a second predetermined value;

a first detection circuit for detecting a defect of said current segment by comparing difference between said current segment data and said preceding segment data with said first predetermined value and for providing a first output related to said comparing with the first predetermined value;

a second detection circuit for detecting a defect of said current segment by comparing said current segment data with said second predetermined value and for providing a second output related to said comparing with the second predetermined value; and a discrimination circuit coupled with said first and second detection circuits for determining whether said current segment is defective or not on the basis at least of said first and second outputs, and for providing a discrimination output and for providing a corresponding discrimination output.

2. A defect detection circuit for an optical pick up device according to claim 1, wherein said defect detection circuit further comprises a threshold generating circuit for determining a threshold level for detecting a defect from said refresh signal on the basis of said discrimination output.

3. A defect detection circuit for an optical pick up device according to claim 1, wherein said first detection circuit comprises a first register for memorizing said current segment data, a second register for memorizing said preceding segment data, a subtracter for conducting subtraction on the basis of outputs from said first and second registers, and a comparator for comparing an output from said subtracter with said first predetermined value.

4. A defect detection circuit for an optical pick up device according to claim 1, wherein said second detection circuit comprises a comparator for comparing said current segment data with said second predetermined value.

5. A defect detection circuit for an optical pick up device according to claim 2, including a source of a third threshold value, wherein said threshold generating circuit comprises a selector for selecting said current segment data or said second predetermined value on the basis of said discrimination output, a subtracter for conducting subtraction on the basis of an output from said selector and said third predetermined value, and a comparator for comparing an output from said subtracter with said refresh signal.

6. A defect detection method for use in an optical pick up device having a record medium on which a track is formed and which has a plurality of segments formed in series along the track, said method comprising the steps of:

generating a refresh signal by sampling segments of said track, said refresh signal including current segment data derived by sampling a current segment and preceding segment data derived by sampling a segment preceding the current segment;

detecting a defect of said current segment by comparing difference between said current segment data and said preceding segment data with a first predetermined value and providing a first output related to said comparing with the first predetermined value;

detecting a defect of said current segment by comparing said current segment data with a second predetermined value and providing a second output related to said comparing with the second predetermined value; and determining whether said current segment is defective or not on the basis at least of said first and second outputs.

* * * * *